Dec. 11, 1923.

L. HAUBERT 1,476,886

AUTOMOBILE STEERING MECHANISM

Filed June 30, 1920

WITNESSES
Howard D. Orr
F. T. Chapman

INVENTOR
Leo Haubert,
BY
C. G. Siggers
ATTORNEY

Dec. 11, 1923. 1,476,886
L. HAUBERT
AUTOMOBILE STEERING MECHANISM
Filed June 30, 1920 2 Sheets-Sheet 2
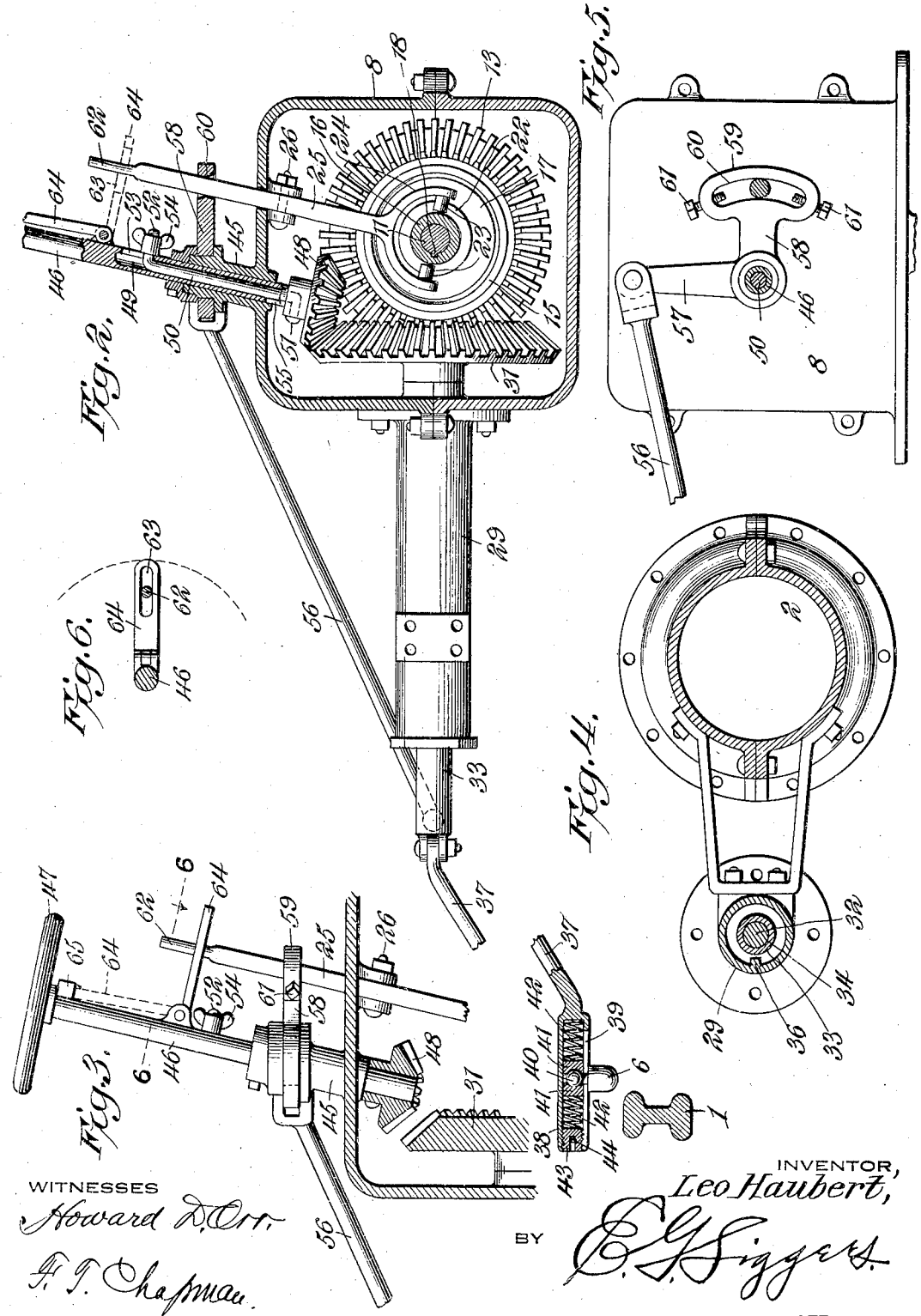
WITNESSES
Howard D. Orr
H. T. Chapman
INVENTOR,
Leo Haubert,
BY
C. G. Siggers.
ATTORNEY Patented Dec. 11, 1923.

1,476,886

UNITED STATES PATENT OFFICE.

LEO HAUBERT, OF MUSKOGEE, OKLAHOMA.

AUTOMOBILE STEERING MECHANISM.

Application filed June 30, 1920. Serial No. 393,087.

*To all whom it may concern:*

Be it known that I, LEO HAUBERT, a citizen of the United States, residing at Muskogee, in the county of Muskogee and State of Oklahoma, have invented a new and useful Automobile Steering Mechanism, of which the following is a specification.

This invention has reference to automobile power steering mechanism and its object is to utilize the prime mover of the automobile for controlling the steering wheels. The invention is designed particularly for use in connection with automobile trucks and tractors and is especially useful where the travel conditions are heavy and control of the steering wheels by hand is difficult or laborious.

In an automobile truck, and more particularly in an automobile tractor, the reduction in speed between the engine and the driving wheels is great and a similar reduction or gearing down between the prime mover and the steering mechanism may be employed, thus not only permitting the ready movement of the steering wheels even under adverse conditions but completely relieving the operator from the labor of controlling the steering wheels.

In accordance with the invention the mode of steering may be changed from hand control to automatic control, or the reverse, without any special effort.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 2 is a section on the line 2—2 of Fig. 1.

Fig. 3 is a section, with some parts in elevation, similar to that of Fig. 2 but showing a different position of the parts.

Fig. 4 is a section on the line 4—4 of Fig. 1.

Fig. 5 is a plan view of the structure shown in Fig. 2.

Fig. 6 is a fragmentary section on the line 6—6 of Fig. 3.

Figure 1:
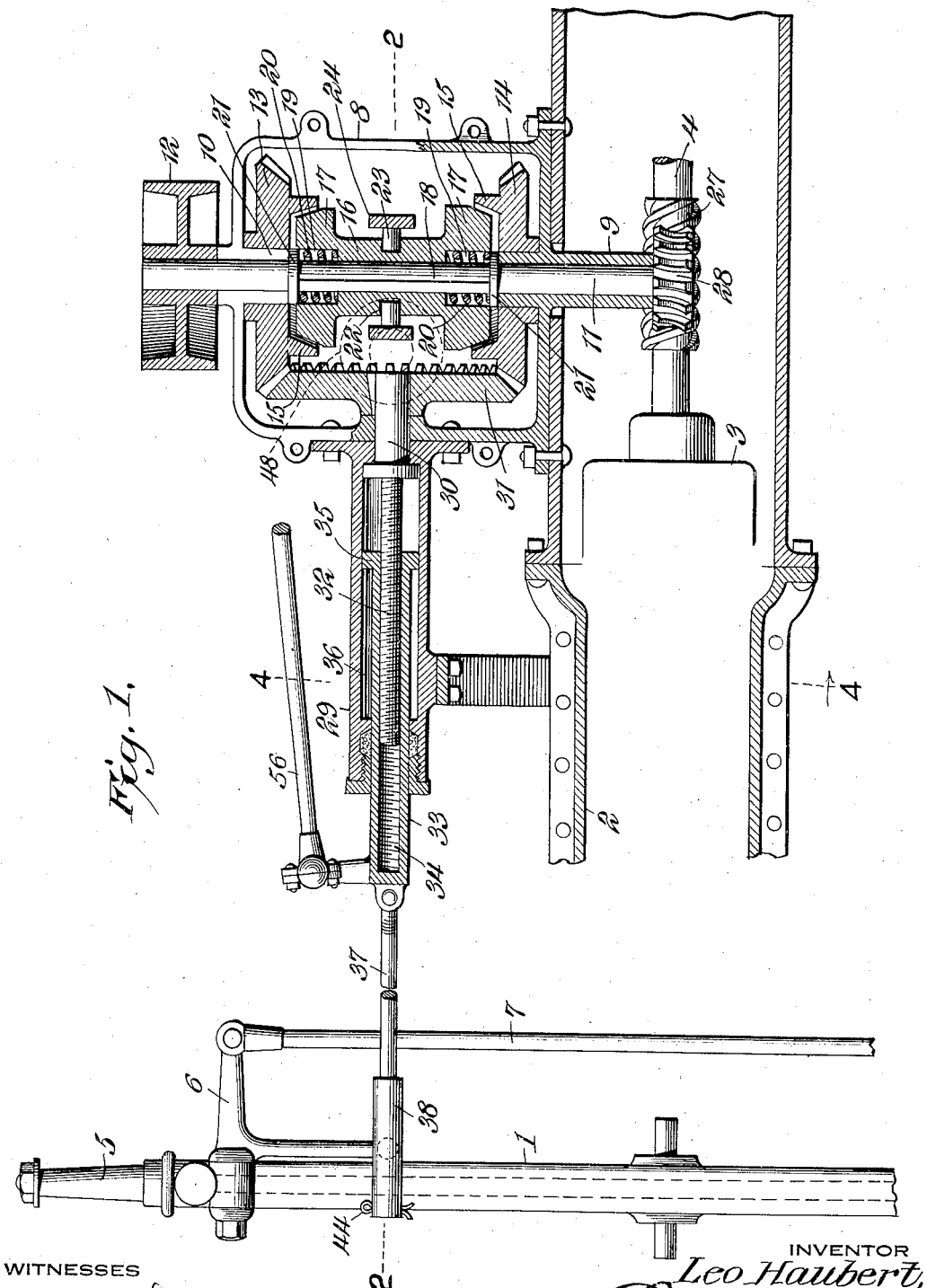
Fig. 1 is a horizontal section, with certain parts in elevation of those parts of an automobile truck or tractor embodying the invention.

Referring to the drawings there is shown a front axle 1, a body portion or backbone 2 of a known type of tractor which may be considered as typical of other types of tractors or automobile trucks. There is also indicated a portion of a power unit or engine 3, which may be considered as of the explosion type, having a power shaft 4 leading therethrough. On the front axle there is mounted a front wheel spindle 5 carrying a steering arm 6 of bell crank form connected by a steering connecting rod 7 to the steering wheel spindle at the other end of the front axle, but not shown in the drawings. The parts described are to be found in existing tractors and consequently require no special description.

Carried by and permanently connected to the main frame or backbone 2 of the truck at one side thereof is a casing or housing 8 shown in the drawings as of general cubical form but the shape of the casing may vary in accordance with circumstances. On diametrically opposite sides of the casing 8 are alined extended bearing sleeves 9 and 10 which may be formed in one piece with or secured to the casing 8 and of sufficient length to constitute bearings for a jackshaft 11 extending from within the main casing or backbone 2 through the casing 8 and beyond the opposite side of the casing where the shaft may be provided with a pulley 12 or other means for transmitting power.

Within the casing 8 the shaft 11 carries spaced bevel gear wheels 13, 14 so mounted on the bearings 9 and 10 respectively as to freely rotate thereon. The gear wheels 13 and 14 are each provided with a conical flange 15 constituting a friction clutch member. Mounted on the shaft 11 between the gear wheels 13 and 14 is a friction clutch sleeve 16 having conical heads 17 adapted to enter the clutch flanges 15. The sleeve 16 is secured to the shaft 11 to rotate therewith, but is permitted to slide thereon, by means of a longitudinal spline 18. The heads 17 are counterbored as shown at 19 and each counterbore houses a spring 20 bearings against a wear plate 21, the two springs 20 coacting to normally centralize the clutch sleeve 16 and hold it in a neutral position with the heads 17 out of engagement with either of the clutch flanges 15.

At an intermediate point of the length of the sleeve 16 there is formed a circumferential groove 22 entered by pins 23, carried by a fork 24 on one end of a lever 25 extending through one side wall of the casing 8. The lever 25 is carried by a pivot bolt or pin 26 so that the lever may be rocked to move the clutch sleeve 16 lengthwise of the shaft 11 into engagement with one or the other of the friction flanges 15 of the respective gear wheels 13 and 14, thus coupling one or the other of said gear wheels to the shaft 11. Rotary motion is imparted to the shaft 11 from the power shaft 4 by way of a worm 27 fast on the shaft 4 to a worm wheel 28 fast to the shaft 11.

Secured to and projecting from one side wall of the casing 8 at right angles to the shaft 11 is an elongated housing 29 having one end of a shaft 30 journaled therein and carrying within the casing 8 a bevel gear wheel 31 keyed or otherwise made fast to the shaft 30 and in mesh with both gear wheels 13 and 14.

The shaft 30 within the housing 29 is of reduced diameter and screw threaded as indicated at 32, and within the housing 29 there is also located an elongated sleeve 33 interiorly screw threaded as shown at 34 to receive the threaded reduced end 32 of the shaft 30. The inner end of the sleeve 33 is formed with a head 35 snugly yet freely fitting the interior of the housing 29. In order to prevent the sleeve 33 from turning about its longitudinal axis the head 35 is engaged by an elongated spline 36 on the interior of the housing 29. The outer end of the sleeve 33 is pivoted to a rod 37 terminating in an elongated hollow head 38 provided with an elongated slot 39 for the entrance of a ball 40 present on the steering arm 6. Within the head 38 the ball 40 is confined between blocks 41 engaged by springs 42 also within the head 38 and a screw block 43 threaded into the end of the head 38 remote from the rod 37 serves as a means for holding the parts together and for adjusting the tension of the springs 42. A cotterpin 44 is employed to hold the block 43 from unscrewing.

Rising from the casing 8 is a boss 45 through which a steering post stem 46 extends, such stem being long enough to enter the casing 8 and rise above the casing to a convenient height where it is provided with a steering wheel 47, such as is customarily employed on automobile trucks or tractors. At the lower end within the casing 8 the steering post 46 carries a bevel pinion 48 so located that it may be moved into mesh with the bevel gear wheel 31 or move out of mesh with relation thereto. For permitting the movement of the pinion 48 without requiring longitudinal movement of the steering post 46 the latter is formed at its lower end with an axle bore 49, of appropriate length to bring the upper end of the bore above the boss 45, and within the bore there is located a rod 50 having a bend 51 at its lower end to secure the rod 50 to the bevel gear wheel 48, and at the upper end the rod 50 has a bend 52 extending through the steering post 46 through an elongated slot 53 therein. The bend 52 is suitably screw threaded and has a wing nut 54 or other suitable structure applied thereto whereby the rod 50 may be secured to the steering post 46 in adjusted positions, the bevel pinion 48 participating in such adjustments. To permit the movement of the bent end 51 of the rod 50 lengthwise of the steering post 46 that end of the steering post within the casing 8 is provided with an elongated slot 55.

Secured at one end to the outer end of the sleeve 33 is a reach rod 56, the other end of which is connected to one arm 57 of a bell crank lever mounted on the post 45. The other arm 58 of the bell crank lever is formed with an elongated curved head 59 in which there is formed a similarly curved slot 60 entered by set screws 61 at the ends of the head 59, so that the effective length of the slot 60 may be varied by adjusting the screws 61. The slot 60 is traversed by the lever 25 wherefore the latter has a determined movement about its pivot support 26 without effect upon the bell crank 57. The bell crank lever may have a like movement without effect upon the lever 25. The upper end of the lever 25 has a reduced extension 62 for passage through an extended slot 63 in a hinged latch strip 64 carried by the steering post 46, and capapable of movement out of engagement with the end 62 of the lever 25 into an inactive position where it may be held by a clip 65 on the steering post.

When the steering mechanism forming the subject matter of this invention is to be operated by hand, the steering post pinion 48 is moved by loosening the thumb nut 54 and lowering the pinion 48, assuming it to have been previously raised, until in mesh with the gear wheel 31. Also the latch 64 is raised out of engagement with the end 62 of the lever 25 and held in the inactive position by the clip 65. Under these circumstances the springs 20 centralize the sleeve 16 so that the latter is out of engagement at both ends with the gear wheels 13 and 14. Now on turning the steering wheel 47 the gear wheel 31 is correspondingly rotated and the sleeve 33 is moved lengthwise in one direction or the other to actuate the steering wheels as desired. Such method of steering is effective where the conditions are favorable but in heavy ground such steering would impose difficulties upon the operator. To avoid this the wing nut 54 is loosened and the pinion 48 is lifted out of mesh with the gear wheel 31 and the rod 50 is refastened in the elevated position. The latch 64 is lowered so that the end 62 of the lever 25 traverses the slot 63, in which position the lever 25 is under the control of the steering wheel 47. When the truck or tractor is being driven by the engine 3 the shaft 11 is being rotated but has at the time no effect upon the shaft 30 since the clutch sleeve 16 and clutch heads 17 are in neutral position. By appropriately manipulating the steering wheel 47 the latch 64 is swung to one side or the other, actuating the lever 25 to throw one or the other of the clutch heads 17 into engagement with the appropriate clutch flange 15 of the gear wheel 13 or 14. When this occurs motion is received from the shaft 11, which motion is a slow motion because of the worm gear connections, and the shaft 30 is slowly rotated in one direction or the other and the sleeve 33 is projected or retracted at a similarly slow rate to swing the steering wheels in one direction or the other as desired, thus effecting the steering of the vehicle in a sufficiently slow manner, but with great power, thereby overcoming various obstacles which the steering wheels may meet. If, for any reason, the movement of the steering wheels in one direction or the other be continued for too long a time there is danger of the steering wheels locking in a cramped position and the possible overturning of the vehicle. Before this can happen, however, one or the other of the set screws 61 is moved by the rotation of the lever steering post into engagement with the lever 25 actuating it into neutral, which movement is aided by the centralizing effect of the opposed springs 20, whereupon the operator may either permit the turning movement to continue or by a proper manipulation of the steering wheel 47 may reverse the action of the power steering mechanism to shift the steering wheels to the desired new position, the only effort on the part of the operator being a light one through only a partial turn of the steering wheel. With the steering mechanism of the invention all heavy steering may be effectively and quickly controlled by a partial turn of the steering wheel 47 in the proper direction while the active adjustment of the steering wheels is caused wholly by the power unit of the vehicle where the power is ample for the purpose.

The springs 42 are made strong enough to transmit the power steering effort to the steering wheels and at the same time introduce a certain amount of elasticity which prevents the transmission of any shocks or blows which might result in the breakage of parts.

What is claimed is:

1. Steering mechanism for automobile trucks or tractors comprising gearing connected to the steering wheels of the truck or tractor, means for coupling the gearing to or uncoupling it from the power unit of the vehicle, a manually operable steering post with a gear mounted on a shaft slidable within the steering post, said gear adapted to connect the steering post with the gearing connected to the steering wheels of the truck or tractor for manual steering purposes, and means for connecting the steering post to the coupling means for utilizing the power unit for controlling the steering wheels.

2. A steering mechanism for automobile trucks or tractors, utilizing the power unit of the automobile, comprising reducing gearing between the power unit and the steering wheels of the automobile, a steering post for manually operating the steering wheels, said reducing gearing including an oppositely acting clutch and screw-actuated means, automatic centralizing means for the clutch, manually operable means for shifting the clutch to control the action of the power means in steering, a pivoted latch for connecting the said manually operable means with the steering post, and a second manually operable means for connecting the steering post with the steering wheels of the automobile or for disconnecting the steering post from the steering wheels when the first-mentioned manually operable means is connected to the steering post to control the power steering means.

3. In a steering mechanism for motor vehicles, power transmitting gearing between the power unit of the vehicle and the steering wheels thereof including a clutch, an operating lever for moving the clutch into or out of active position, and automatic throw-out means for the clutch including a rock arm operatively connected with said gearing and having a lost motion connection with the clutch-operating lever.

4. In a steering mechanism for motor vehicles, power transmitting gearing between the power unit and the steering wheels of the vehicle, including a clutch and an operating lever therefore, a manually operable steering post for the vehicle, and automatic throw-out means including an arm pivoted to rock about the steering post as an axis and operated by the movement of said gearing, said arm having a lost motion connection with the clutch lever to disconnect the clutch after a certain predetermined angular movement of the steering wheels.

5. In steering mechanism for automobile trucks or tractors, driving gearing for the steering wheels between the latter and the power unit of the auntomobile and including a reciprocable member, said driving gearing also including an oppositely acting clutch device, a lever for actuating the clutch, and means between the reciprocable member and the clutch lever for actuating the latter for a predetermined distance to then throw the clutch into inactive position.

6. In a steering mechanism for motor vehicles, the combination with a power driven shaft and gearing for operating the steering wheels, of an oppositely movable clutch between the shaft and gearing for causing the reversal of direction of actuation of the steering wheels by the power unit, a clutch lever for causing the movements of the clutch, a steering post, an arm pivoted on the steering post, means connecting the steering gear and the arm for rocking the latter, and connections between said arm and the clutch lever effective only at the terminal portions of a predetermined range of movement of the gearing in either direction for returning the clutch to neutral position.

7. In steering mechanism for automobile trucks or tractors, gearing between the power unit of the automobile and the steering wheels and including a slidable member, a double acting clutch for controlling the direction of movement of the gearing for turning of the steering wheels in one direction or the other, a lever for controlling said clutch and a lever connected to the slidable member of the gearing and having a slotted arm embracing the clutch lever with the slot elongated to permit lost motion of the slotted arm whereby to engage the clutch lever to throw the clutch out of action when the steering movement of the steering wheels has reached predetermined limits.

8. In steering means for automobile trucks or tractors, gearing transmission between the power unit of the automobile and the steering wheels, a steering post, a pinion carried by the steering post and movable lengthwise thereof into and out of engagement with the gearing, and means for moving and holding the pinion in active or inactive positions comprising a rod carried by and slidable lengthwise of the steering post and at one end carrying the pinion for meshing with the gearing and at the other end provided with holding means for the rod and pinion when the latter is either in or out of mesh with the gearing.

9. Steering mechanism for automobile trucks or tractors, comprising a steering post, gearing connected to the steering wheels of the truck or tractor, a steering pinion, a carrier for the pinion on and movable lengthwise of the steering post, and means for clamping the carrier for the pinion into or out of mesh with the steering gearing.

10. In steering mechanism for automobile trucks or tractors, a steering post, steering gearing for shifting the steering wheels of the automobile, a pinion for connecting the steering post to the steering gearing, a carrier for the pinion movable lengthwise of the steering post and connected thereto for rotative movement with the steering post, and clamping means on the carrier for holding the pinion in or out of mesh with the steering gearing.

11. Steering mechanism for automobile trucks or tractors comprising gearings connected to the steering wheels of the truck or tractor, a steering post, a clutch for connecting and disconnecting parts of the steering gearing to and from the power unit of the automobile, a lever for operating the clutch, and a gear controlled by the steering post for connecting the gearing thereto for manual operation when the power unit of the automobile is disconnected from the steering post by throwing out the clutch, said lever for operating the clutch being adapted to be connected to the steering post and operated thereby, and means on the steering post adapted to be operated independently of said steering post for automatically returning said operating lever to neutral.

12. Steering mechanism for automobile trucks or tractors comprising two shafts in perpendicular relation to each other, spaced gear wheels on one shaft, another gear wheel on the second shaft meshing with both of the first named gear wheels, and a clutch member between the spaced gear wheels and slidable on and rotatable with the shaft carrying it, said gear wheels being provided with clutch members coacting with the respective ends of the first named clutch member, a clutch lever for shifting the first named clutch member into and out of engagement with either of the companion clutch members, a manually operable steering post, a pinion thereon movable at will into and out of mesh with the second named gear wheel, and latch means on the steering post movable into and out of operable relation to the clutch lever.

13. Steering mechanism for automobile trucks or tractors comprising two shafts in perpendicular relation to each other, spaced gear wheels on one shaft, another gear wheel on the second shaft meshing with both of the first named gear wheels, and a clutch member between the spaced gear wheels and slidable on and rotatable with the shaft carrying it, said gear wheels being provided with clutch members coacting with the respective ends of the first named clutch member, a clutch lever for shifting the first named clutch member into and out of engagement with either of the companion clutch members, a manually operable steering post, a pinion thereon movable at will into and out of mesh with the second named gear wheel, and latch means on the steering post movable into and out of operable relation to the clutch lever, said connection between the sleeve and the steering wheel assembly including elastic centering means.

14. Steering mechanism for automobile trucks or tractors, comprising gearing connected to the steering wheels of the truck or tractor, said gearing including a screw shaft for causing steering movements of the steering wheels, oppositely disposed gear wheels with an intermediate connecting gear wheel, the oppositely disposed gear wheels having clutch members thereon, a jack or countershaft connected to and extending between the oppositely disposed gear wheels, connections between said jackshaft and the power unit of the automobile truck or tractor, a clutch member carried by the jackshaft and movable into engagement with either of the clutch members on the oppositely disposed gear wheels, a rock lever connected to the second named clutch member for moving it along the jackshaft with said clutch member splined to the jackshaft, a steering post, a pinion carried by the steering post and movable lengthwise thereof into and out of engagement with one of the gear wheels, and means on the steering post for connecting the latter to the clutch operating lever, whereby the pinion on the steering post may be moved into and out of engagement with its companion gear wheel and the connecting means on the steering post may, at the same time, be moved out of or into engagement with the clutch operating lever to provide for manual or power steering at will.

In testimony that I claim the foregoing as my own, I have hereto affixed my signature.

LEO HAUBERT.